United States Patent
Tsukamoto et al.

(10) Patent No.: US 8,893,833 B2
(45) Date of Patent: *Nov. 25, 2014

(54) SWING ARM DEVICE FOR ELECTRIC TWO- OR THREE-WHEELED VEHICLE

(75) Inventors: Tomohiro Tsukamoto, Wako (JP); Takashi Tominaga, Wako (JP); Kazumi Shibata, Wako (JP); Hisao Nishiura, Wako (JP); Seiji Kato, Wako (JP); Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 13/821,359

(22) PCT Filed: Sep. 28, 2011

(86) PCT No.: PCT/JP2011/072215
§ 371 (c)(1),
(2), (4) Date: Mar. 7, 2013

(87) PCT Pub. No.: WO2012/043643
PCT Pub. Date: Apr. 5, 2012

(65) Prior Publication Data
US 2013/0175102 A1    Jul. 11, 2013

(30) Foreign Application Priority Data

Sep. 30, 2010  (JP) .................................. 2010-222876

(51) Int. Cl.
| | |
|---|---|
| *B60K 1/04* | (2006.01) |
| *B62K 5/027* | (2013.01) |
| *B62K 11/10* | (2006.01) |
| *B62K 11/00* | (2006.01) |
| *B62K 25/28* | (2006.01) |
| *B62K 19/30* | (2006.01) |
| *B62K 25/04* | (2006.01) |

(52) U.S. Cl.
CPC ................. *B62K 11/00* (2013.01); *B62K 5/027* (2013.01); *B62K 11/10* (2013.01); *B62K 2204/00* (2013.01); *B62K 2202/00* (2013.01); *B62K 25/283* (2013.01); *B62K 19/30* (2013.01); *B62K 25/04* (2013.01); *B62K 2208/00* (2013.01)
USPC ........................................ 180/65.51; 180/220

(58) Field of Classification Search
CPC ... B60K 1/04; B60L 11/1809; B60L 11/1816; B60L 11/1818; B62K 2204/00; B62M 7/12
USPC .............................................. 180/220, 65.51
See application file for complete search history.

(56) References Cited

U.S. PATENT DOCUMENTS

| | | | | |
|---|---|---|---|---|
| 5,222,572 | A | * | 6/1993 | Yamagiwa et al. ........... 180/220 |
| 5,540,312 | A | * | 7/1996 | Ogawa et al. ............... 191/12 R |

(Continued)

FOREIGN PATENT DOCUMENTS

| | | |
|---|---|---|
| EP | 2 168 859 A1 | 3/2010 |
| FR | 2 874 756 A1 | 3/2006 |

(Continued)

*Primary Examiner* — Ruth Ilan
(74) *Attorney, Agent, or Firm* — Birch, Stewart, Kolasch & Birch, LLP

(57) ABSTRACT

Provided is a swing arm device for an electric two- or three-wheeled vehicle that can be reduced in the number of components for a reduction in weight while being mounted compact in an electric vehicle for which a swing arm of an electric vehicle includes a battery and a charger. The swing arm device for an electric two- or three-wheeled vehicle to be fitted on an electric vehicle includes a swing arm (30) one end of which is coupled to a swing shaft and the other end of which supports a rear wheel (WR), an electric motor (M) placed at the other end side of the swing arm (30) and for driving the rear wheel (WR), and a battery (56) for supplying electric power to the electric motor (M), and a charger (200) for charging the battery (56) is incorporated in the swing arm (30).

10 Claims, 10 Drawing Sheets

(56) References Cited

U.S. PATENT DOCUMENTS

| | | | |
|---|---|---|---|
| 6,590,306 B2* | 7/2003 | Terada | 310/75 C |
| 7,506,708 B2 | 3/2009 | Iwashita | |
| 8,167,070 B2 | 5/2012 | Takamura et al. | |
| 8,360,188 B2 | 1/2013 | Yonehana et al. | |
| 8,640,810 B2* | 2/2014 | Tsukamoto et al. | 180/220 |
| 2002/0117916 A1* | 8/2002 | Terada | 310/75 C |
| 2006/0037801 A1 | 2/2006 | Iwashita | |
| 2010/0078237 A1 | 4/2010 | Yonehana et al. | |
| 2010/0078248 A1 | 4/2010 | Kanno et al. | |
| 2010/0163326 A1 | 7/2010 | Takamura et al. | |
| 2012/0090254 A1* | 4/2012 | Vemuri | 52/223.6 |
| 2013/0153323 A1* | 6/2013 | Tsukamoto et al. | 180/220 |

FOREIGN PATENT DOCUMENTS

| | | |
|---|---|---|
| JP | 2008-100609 A | 5/2008 |
| JP | 2008-221976 A | 9/2008 |
| JP | 2010-83366 A | 4/2010 |
| WO | WO 2010/109969 A1 | 9/2010 |

\* cited by examiner

SWING ARM DEVICE FOR ELECTRIC TWO- OR THREE-WHEELED VEHICLE

TECHNICAL FIELD

The present invention relates to a swing arm device for an electric two- or three-wheeled vehicle, and particularly, relates to a swing arm vehicle for which a battery for an electric vehicle and a charger are disposed for an electric two- or three-wheeled vehicle including a swing arm.

BACKGROUND ART

As a structure for fixing a battery in an electric vehicle such as an electric motorcycle, a fuel-cell motorcycle, or a hybrid motorcycle, there is disclosed a structure in which one end of a swing arm is coupled to a swing shaft, the other end of the swing arm supports the rear wheel, an electric motor for driving the rear wheel is placed at the other end side of the swing arm, and a battery is disposed at a position near the swing shaft of the swing arm, as disclosed in, for example, Patent Document 1.

CITATION LIST

Patent Literature

Patent Document 1: Japanese Published Unexamined Patent Application No. 2008-221976

SUMMARY OF INVENTION

Technical Problem

Patent Document 1 describes disposing a motor, a PDU, and a battery in a swing arm, however, because the battery needs to be charged, it is necessary to mount a charger on a vehicle body. In that case, it is necessary to design where on the vehicle body side the charger is disposed, and in addition, it is also necessary to consider how wiring for the battery and charger is routed between the swing arm to swing and the vehicle body being a stationary side.

The present invention has been proposed in view of the circumstances as described above, and an object thereof is to provide a swing arm device for an electric two- or three-wheeled vehicle suitable for an electric two- or three-wheeled vehicle for which a swing arm of an electric vehicle includes a motor, a PDU, and a battery and charger, the swing arm stores electrically-operated components integrally, and wiring is simplified as much as possible, and which does not require large modification on the vehicle body side.

Solution to Problem

To achieve the above objects, the present invention has a first feature in that a swing arm device for an electric two- or three-wheeled vehicle to be fitted on an electric vehicle including a swing arm (30) one end of which is coupled to a swing shaft and the other end of which supports a rear wheel (WR), an electric motor (M) placed at the other end of the swing arm (30) and for driving the rear wheel (WR), and a Power Drive Unit (PDU) and a battery (56) for supplying electric power to the electric motor (M), wherein a charger (200) for charging the battery (56) is incorporated in the swing arm (30).

The present invention has a second feature in that a control unit (50) for controlling energization of the electric motor (M) is disposed at a front end side of the swing arm (30), the charger (200) is integrally disposed on the control unit (50), while the charger (200) includes a charge cord (220) for external charging, a storage portion (300, 301, 302, 303, 304, 305) for storing the charge cord (220) is provided on a vehicle body side of the electric vehicle, and the charge cord (220) is routed into the storage portion (300, 301, 302, 303, 304, 305) from the control unit through near the swing shaft of the swing arm.

The present invention has a third feature in that components with small heat capacities are aggregated on a control board (50a) that is placed at a vehicle front side in the control unit (50) and components with large heat capacities are disposed in a modularized manner at a rear end side of the swing arm (30) with respect to the control board (50a).

The present invention has a fourth feature in that a storage portion (301) for storing the charge cord (220) is provided under a floorboard of the electric vehicle.

The present invention has a fifth feature in that a storage portion (302) for storing the charge cord (220) is provided under a step of the electric vehicle.

The present invention has a sixth feature in that a storage portion for storing the charge cord (220) is provided below a storage box (21) of the electric vehicle.

The present invention has a seventh feature in that a lid (306) for taking out the charge cord (220) is provided in an exterior surface that covers the outside below the storage box (21).

The present invention has a eighth feature in including a cap (230) for insulation and waterproofing in a charging terminal (215) at a tip of the charge cord (220).

The present invention has a ninth feature in that the charge cord (220) has stretchability.

The present invention has a tenth feature in that in a meter device (9) for indicating a vehicle state placed on the electric vehicle, an indicator (250) for confirming charge of the charger (200) is provided.

Advantageous Effects of Invention

According to a first aspect of the present invention, as a result of incorporating the charger (200) in the swing arm (30), a reduction in wiring between the charger (200) and the battery (56) and concentration and compact placement of electrical components due to integral storage of the electrically-operated components can be achieved.

Moreover, the electrically-operated components that require large modification on the vehicle body side can be integrally stored.

According to a second aspect of the present invention, electrical systems can be directly connected between the charger (200) and the control unit (500), and the number of components can be reduced by simplifying wiring cables.

According to a third aspect of the present invention, disposing the components of the control unit (50) in a modularized manner allows having optimal placement by function, and space saving can be achieved.

According to a fourth aspect of the present invention, when providing a storage portion of the charge cord (220), effective use of the dead floor space including steps and a step-over portion can be achieved.

According to a fifth aspect of the present invention, when providing a storage portion of the charge cord (220), effective use of the dead space under the step can be achieved.

According to a sixth aspect of the present invention, when providing a storage portion of the charge cord (220), effective use of the dead space below the storage box (21) can be achieved.

According to a seventh aspect of the present invention, providing the dedicated take-out opening in the storing portion (305) allows an improvement in convenience when taking out the charge cord (220).

According to an eighth aspect of the present invention, fitting the cap (230) on the charging terminal (215) at the tip of the charge cord (220) allows preventing electric leakage and deterioration of the terminal of the charge cord (220) in a non-use state.

According to a ninth aspect of the present invention, the charge cord (220) having stretchability allows an improvement in ease of storing into the storage portion.

According to a tenth aspect of the present invention, by providing the indicator (250) in the meter device (9), and the indicator (250) turning on to start charging and turning off when the charging is completed, charge confirmation can be easily performed.

DESCRIPTION OF EMBODIMENTS

Figure 1:
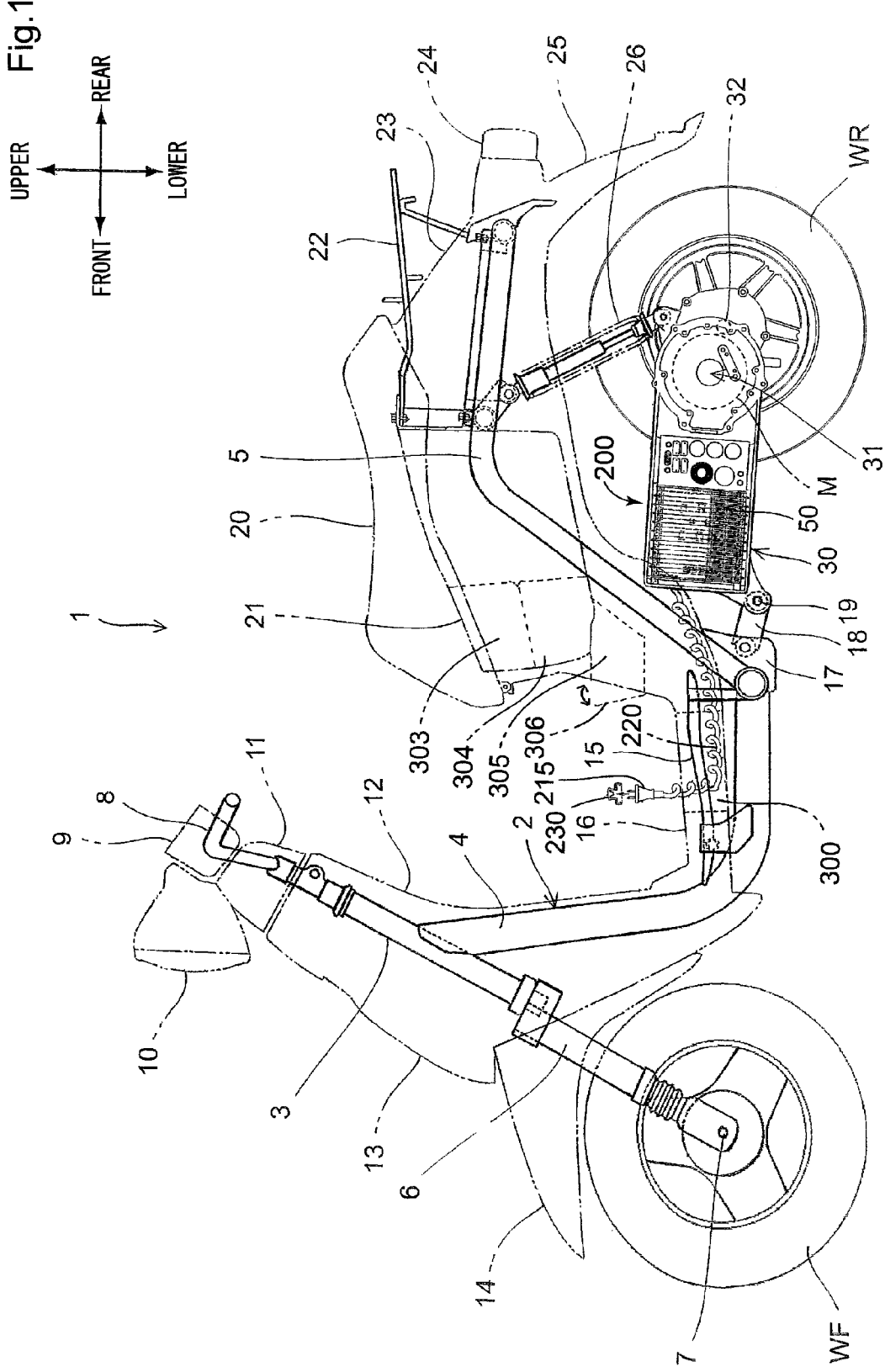
FIG. 1 is a left side view of an electric two-wheeled vehicle mounted with a battery for an electric vehicle of the present invention.

Hereinafter, preferred embodiments of the present invention will be described in detail with reference to the drawings. FIG. 1 is a side view of an electric two-wheeled vehicle 1 according to an embodiment of the present invention. The electric two-wheeled vehicle 1 is a scooter type saddle-type vehicle having a low floorboard 16, and drives a rear wheel WR by an electric motor M stored in a swing arm (unit swing) 30. To a front portion of a vehicle body frame 2, a head pipe 3 that pivotally supports a stem shaft (not shown) so as to be freely rotatable is joined. To an upper portion of the stem shaft, a steering handle 8 to be covered with a handle cover 11 is joined, and to a lower portion, on the other hand, a pair of left and right front forks 6 that pivotally support a front wheel WF so as to be freely turnable by an axle 7 are joined.

The vehicle body frame 2 includes a main pipe 4 extending downward from a rear portion of the head pipe 3 and a rear frame 5 coupled to a rear end portion of main pipe 4 and extending upward in a vehicle-body rear portion. To the main pipe 4 located under the low floorboard 16, a floor frame 15 that supports the low floorboard 16 is attached. Moreover, to a junction portion between the main pipe 4 and the rear frame 5, a pair of left and right pivot plates 17 are attached.

The swing arm 30 is a cantilever type having an arm portion at only the left side in the vehicle width direction, and is pivotally supported on the vehicle frame 2 so as to be freely swingable via a swing shaft 19 that penetrates through a link 18 attached to the pivot plate 17. The swing arm 30 is a partially hollow structure made of a metal such as aluminum, in which the electric motor M is stored near an axle 32, and a board 50 serving as a control device is arranged in front of the electric motor M in the vehicle body. A battery 56 (refer to FIG. 3) that supplies electric power to the electric motor M is arranged on the right side in the vehicle width direction of the board 50.

The rear wheel WR is pivotally supported on the swing arm 30 so as to be freely rotatable by the axle 32, and a rear end portion of the swing arm 30 is suspended from the rear frame 5 via a rear cushion 26. Moreover, under a seat 20, a storage box 21 to serve as a baggage locker space is disposed so as to be sandwiched by the pair of left and right rear frames 5.

The main pipe 4 of the vehicle body frame 2 is covered with a front cowl 13 on a side forward of the vehicle body and a leg shield 12 on a side rearward of the vehicle body. On the top of the handle cover 11, a meter device 9 is arranged, and at a side forward of the vehicle body with respect to the meter device 9, a headlight 10 is attached. To an upper portion of the front forks 6, a front fender 14 that covers the front wheel WF is fixed.

The outside of the rear frame 5 in the vehicle width direction is covered with a seat cowl 23, and a tail lamp device 24 is attached to a rear end portion of the seat cowl 23. Above the tail lamp device 24, a rear carrier 22 joined to the rear frame 5 projects, and below the tail lamp device 24, a rear fender 23 that covers the rear wheel WR from behind and above is provided.

Figure 2:
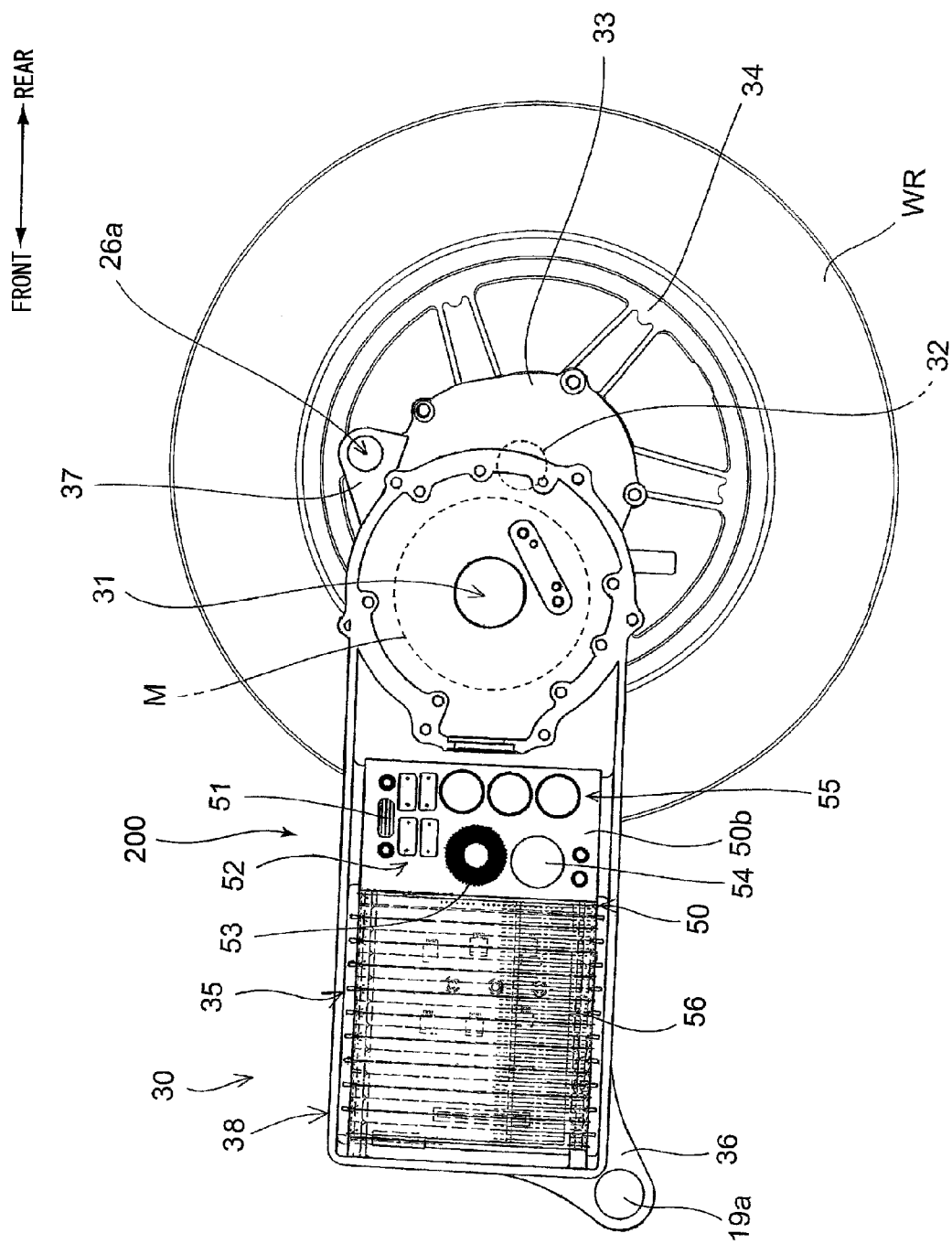
FIG. 2 is a left side view showing an example of an embodiment of a battery for an electric vehicle of the present invention, which shows a state where a cover of a swing arm part where the battery for an electric vehicle is disposed is removed.
Figure 3:
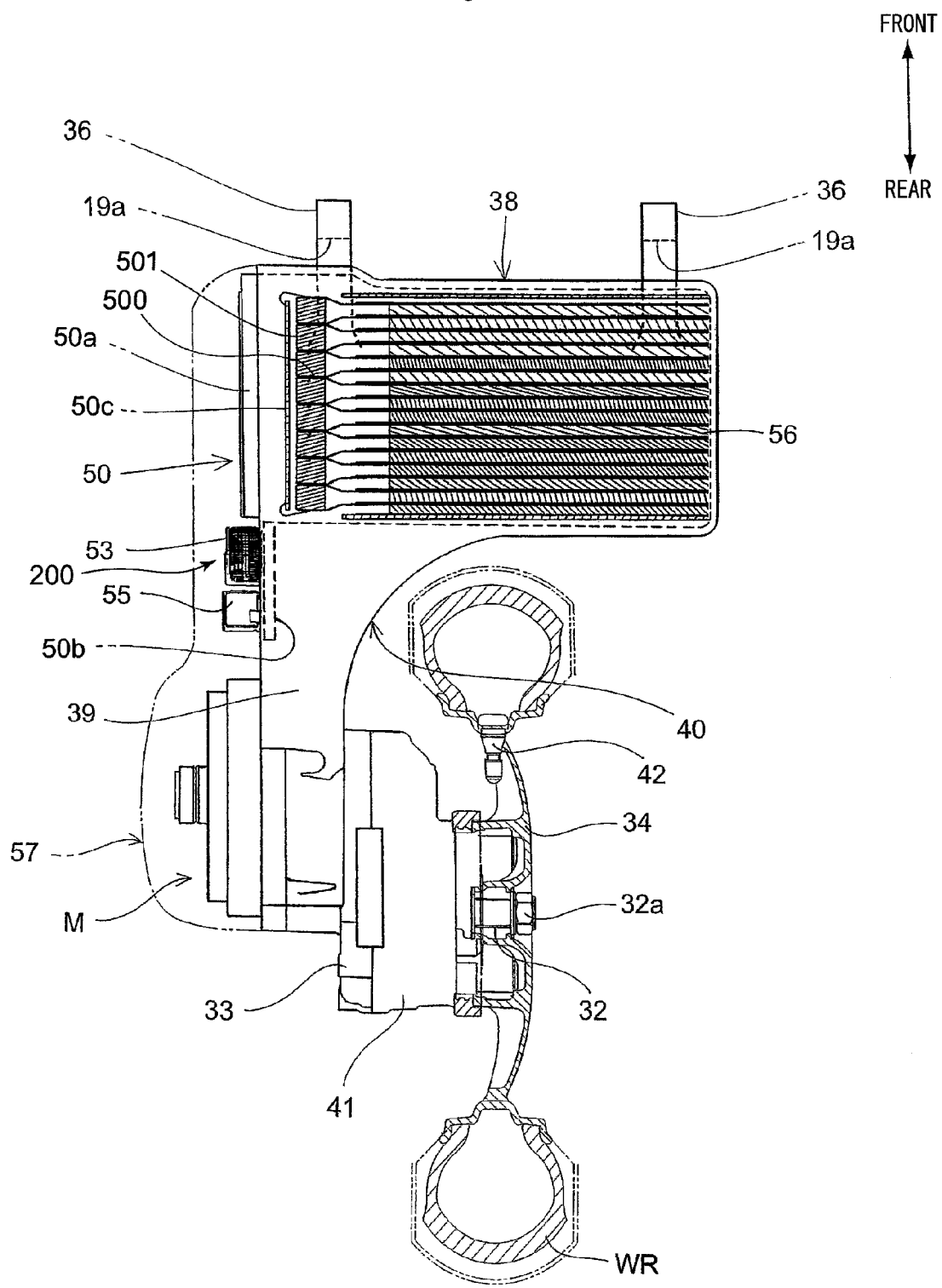
FIG. 3 is a top view of the swing arm part of FIG. 2 in which the battery for an electric vehicle is disposed.
Figure 4:
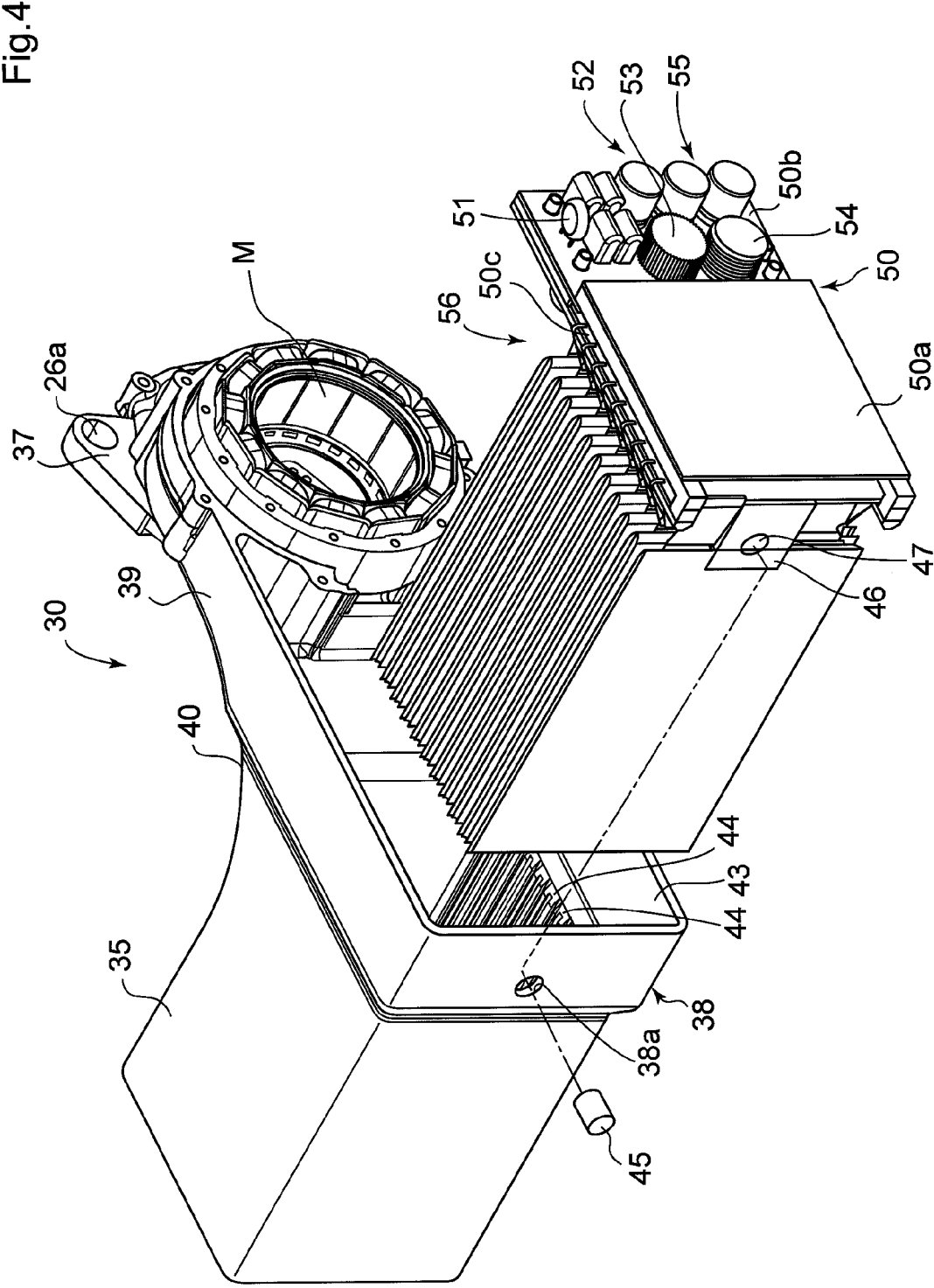
FIG. 4 is an exploded perspective view of the swing arm.

FIG. 2 is an enlarged side view of the swing arm 30 mounted with a battery for an electric vehicle in a state where a cover is removed. Moreover, FIG. 3 is a top view of the swing arm 30, and FIG. 4 is an exploded perspective view of the swing arm 30. The same reference signs as the above denote the same or equivalent parts. As described above, the swing arm 30 is a partially hollow structure made of a metal such as aluminum, and provided as a cantilever type that supports the rear wheel WR by an arm portion 39 provided on the left side in the vehicle width direction. In a lower portion on a side forward of the vehicle body with respect to the swing arm 30, a pair of left and right pivot flanges 36 each formed with a through-hole 19a for the swing shaft 19 (refer to FIG. 1) are provided.

On a side upward of the vehicle body with respect to the pivot flanges 36, a storage space 35 into which the battery 56 consisting of a plurality of battery cells is inserted is formed, and a wide case portion 38 that forms an outer shell portion of the storage space 35 and the arm portion 39 are continuously formed via a curved portion 40. At the left side in the vehicle width direction of the storage space 35 and the arm portion 39, a thin plate-like swing arm cover 57 that covers the board 50 and the electric motor M in an integrated manner is attached.

To a rear end portion of the arm portion 39, reduction gear cases 33, 41 in which reduction gears that reduce the rotation speed of the electric motor M is stored are attached. The axle 32 projects toward the right side in the vehicle width direction from the reduction gear case 41, and to an end portion of the axle 32, a wheel 34 of the rear wheel WR is fixed by a nut 32a. A tubeless tire is used for the rear wheel WR, and an air valve 42 is provided on the wheel 34. Moreover, on the reduction gear case 33, a mounting flange 37 formed with a through-hole 26a for attaching the rear cushion 26 (refer to FIG. 1) is provided.

Figure 5:
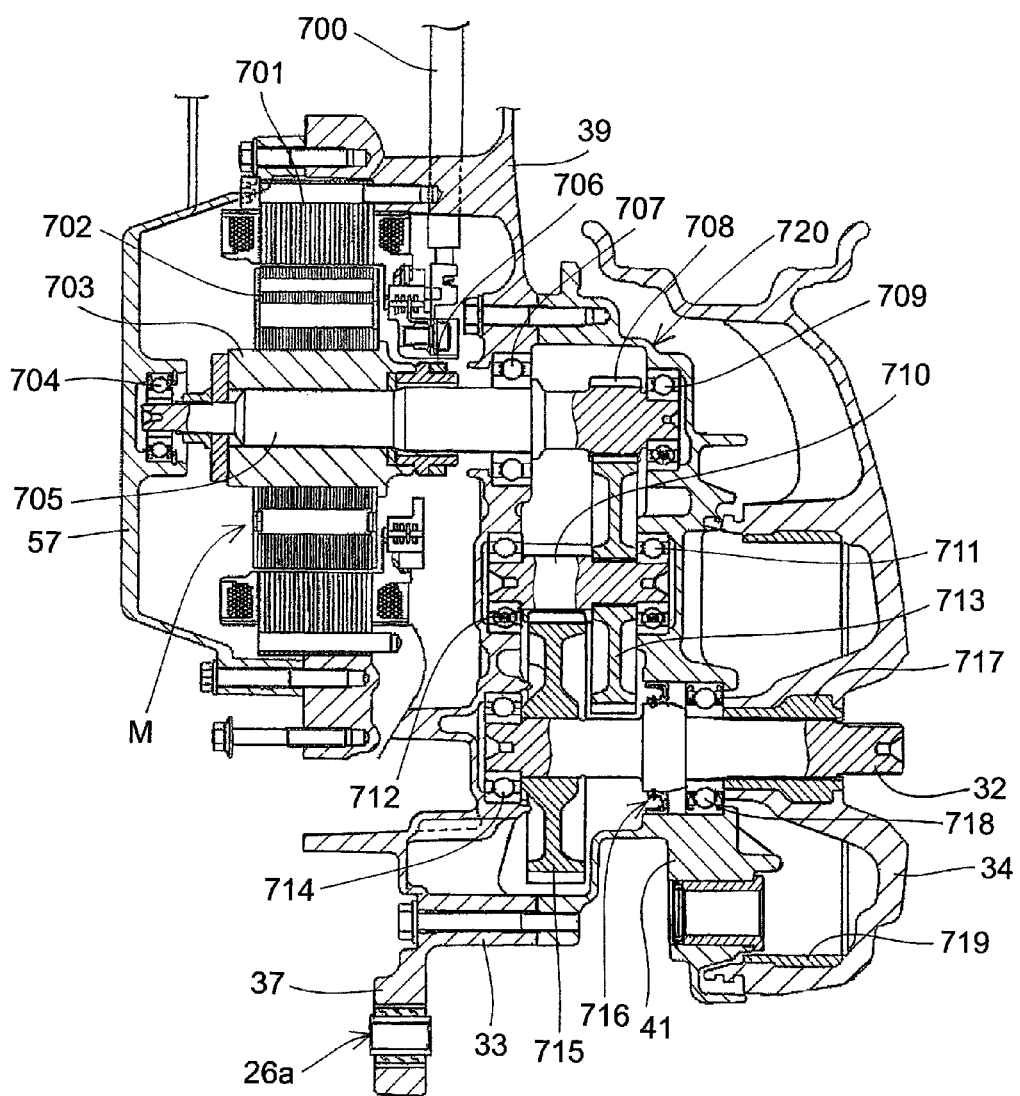
FIG. 5 is an enlarged sectional view of a reduction gear mechanism.

FIG. 5 is an enlarged sectional view of a reduction gear mechanism 720. There is arranged a reduction gear mechanism between the electric motor M and the axle 32. The swing arm 30 according to the present embodiment is a cantilever type that supports the rear wheel WR by only a left arm portion, and at a position on a side rearward of the vehicle body of the arm portion, the electric motor M and the reduction gear mechanism 720 are disposed in a concentrated manner.

The electric motor M is provided as an inner rotor type consisting of a stator 701 fixed to an inner wall of the swing arm 30 and having a stator coil and a rotor 702 fixed to a motor drive shaft 705 via a collar 703. An end portion of the left side in the vehicle width direction of the motor drive shaft 705 is pivotally supported by a bearing 704 fitted in the swing arm cover 57. The right side in the vehicle width direction of the motor drive shaft 705 is pivotally supported by a bearing 707 fitted in the reduction gear case 33 and a bearing 709 fitted in the reduction gear case 41. At an end portion rearward of the vehicle body of the reduction gear case 33, a support hole 26a for a rear shock unit 26 is formed. In the swing arm cover 57, on a side forward of the vehicle body of the electric motor M, an output wiring 700 of the electric motor M is arranged.

Rotational drive force transmitted to the motor drive shaft 705 is transmitted to the final output shaft (axle) 32 via the reduction gear mechanism 720. Specifically, the rotational drive force is transmitted, via a first reduction gear wheel 713 that meshes with a reduction gear 708 formed at an end portion of the right side in the figure of the motor drive shaft 705, a first reduction shaft 710 that is pivotally supported so as to be freely rotatable by a bearing 712 fixed to the first reduction gear wheel 713 and fitted in the reduction gear case 33 and a bearing 711 fitted in the reduction gear case 41, and a second reduction gear wheel 715 that meshes with a reduction gear formed on the first reduction shaft 710, to the final output shaft 32 that is pivotally supported so as to be freely rotatable by a bearing 714 fixed to the second reduction gear wheel 715 and fitted in the reduction gear case 33 and a bearing 718 fitted in the reduction gear case 41. To an end portion of the right side in the figure of the final output shaft 32, the wheel 34 of the rear wheel WR is fixed via a collar 717. On the inner diameter side of the wheel 34, a brake drum having a liner 719 is formed, and inside thereof, a pair of upper and lower brake shoes (not shown) to be driven by a brake cam (not shown) is stored. On the side leftward in the figure with respect to the bearing 718, an oil seal 716 is disposed.

Near the swing shaft on one end side of the swing arm 30, there is formed inside a square-shaped storage space 35 in an integrated manner. The storage space 35 is arranged so that, when the swing arm 30 is fitted on an electric vehicle, an opening side (opening portion) of the storage space 35 is located lateral to the electric vehicle, and the battery 56 can be inserted from the opening side.

A battery for an electric vehicle, as a result of the battery 56 being assembled onto the board (control unit) 50 in an integrated manner, and being inserted and fixed to the storage space 35 of the swing arm 30 in the assembled state, is mounted on an electric two-wheeled vehicle by being directly fitted on the swing arm 30 without using a dedicated case.

The battery 56 according to the present embodiment has a module structure configured so as to obtain a predetermined high voltage by connecting a plurality of battery cells. The plate-like battery cells, which have been laminated with their planar portions oriented in the front-rear direction of the vehicle body, are stored in the storage space 35 having a substantially rectangular parallelepiped shape formed in the wide case portion 38. Accordingly, the battery 56 being a heavy object is disposed close to the swing shaft 19 of the swing arm 30, and the moment of inertia during swinging of the swing arm 30 is reduced to allow a smooth swing motion. Moreover, the battery cells are provided as a laminate type where each cell is packed with a soft laminate sheet. By the laminate-type battery, not only can a high energy density and an improvement in heat dissipation performance be expected, but an attaching operation to the swing arm 30 and a battery replacement operation are also facilitated.

The board (control unit) 50 serving as a control device internally containing a battery charger according to the present embodiment is arranged close to the battery 56 on the left side in the vehicle width direction thereof. The board (control unit) 50 consists of a control board 50a, a heating element board 50b, and an aluminum board 50c, and which are disposed so that their respective planar portions are oriented in the vehicle width direction. The control board 50a is disposed close to the battery 56 on the left side in the vehicle width direction thereof, and the heating element board 50b is coupled to a side rearward of the vehicle body of the control board 50a. The aluminum board 50c is disposed close to the battery 56 on the left side in the vehicle width direction thereof. Further, circuits and elements, etc., (a thermistor 51, a group of input/output filters 52 for a charger, a charger power factor improving inductor 53, a charger power factor improving capacitor 54, a DC output smoothing capacitor 55) disposed in a dispersed manner on the respective boards compose a charger 200. As a result of disposing the components on the respective boards in a dispersed manner to form a charger 200 and incorporating the charger 200 in the swing arm 30, electrical systems can be directly connected, and the number of components can be reduced by simplifying flexible wiring cables (harnesses).

A charge cord 220 for external charging connected to the charger 200 is stored in a storage portion 300 provided under the low floorboard 16. The charge cord 220 is formed in a curled shape having stretchability, and to an AC plug (charging terminal) 215 at its tip portion, a cap 230 for insulation and waterproofing is freely removably fitted. This arrangement allows for effective use of the dead space under the low floorboard 16. Moreover, forming the charge cord 220 in a curled shape allows an improvement in ease of storing, and the freely removable cap 230 allows preventing electric leakage and deterioration of the terminal of the charge cord 220 in a non-use state.

Moreover, the storage portion 300 may include a winding device for the charge cord 220.

Figure 6:
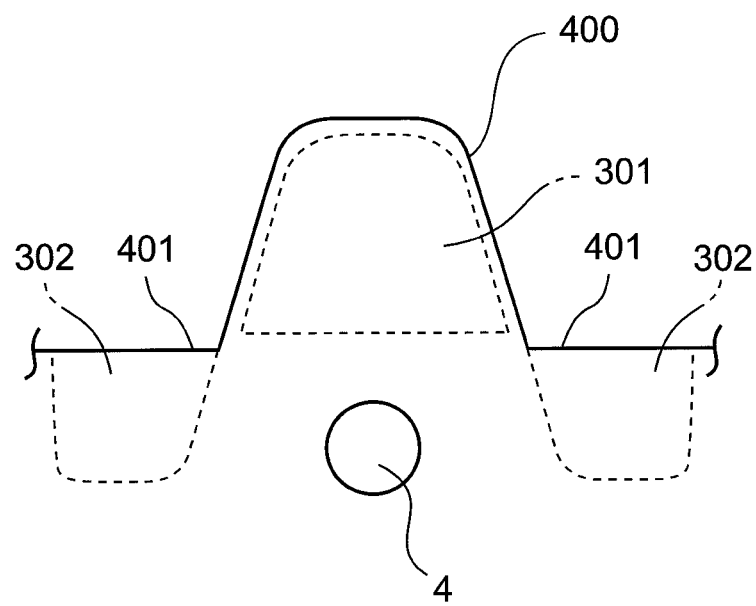
FIG. 6 is an explanatory sectional view showing a floor tunnel part in a vehicle having a floor tunnel.

In the foregoing example, the storage portion 300 is formed under the low floorboard 16, however, as shown in, for example, FIG. 6, in the case of a vehicle of a type having a floor tunnel 400, a storage portion 301 may be formed in a part located on the main pipe 4 that is inserted through the inside of the floor tunnel 400 in the front-rear direction, and storage portions 302 may be formed under steps 401 located on both sides of the floor tunnel 400. This arrangement allows for effective use of the dead floor space including the steps 401 and the floor tunnel (step-over portion) 400.

Moreover, in the case of a vehicle including the storage box 21 that stores a helmet etc., under the seat 20, as shown in FIG. 1, a storage portion 303 or 304 may be provided at a position upward or position downward of the storage box 21. Further, when there is a space under the storage box 21, a storage portion 305 may be provided in the space under the storage box 21. This arrangement allows for effective use of the dead space below the storage box 21.

Further, providing a lid 306 for taking out the charge cord 220 in an exterior surface that covers the outside of the storage portion 305 can provide a structure which allows taking out the charge cord 220 without opening the seat 20. Providing a dedicated take-out opening by the lid 306 allows an improvement in convenience when taking out the charge cord 220.

Between the battery 56 and the aluminum board 50c, a sponge rubber 501 having a predetermined thickness width is disposed. In the sponge rubber 501, a plurality of slits for inserting a plate-like terminal 500 provided at the left end portion in the figure of each battery cell are formed. As a result of inserting the plate-like terminal 500 into each slit, the position of the plate-like terminal is defined. Moreover, by the sponge rubber 501, the usage of a potting material 59 (refer to FIG. 5) during a potting process to be described later can be reduced for a reduction in weight of the swing arm 30. The aluminum board 50c is disposed close to the sponge rubber 501.

On the control board 50a, elements for control signals that generate little heat are mounted. On the other hand, elements in which a large current flows to generate heat are mounted on the heating element board 50b and the aluminum board 50c. Further, out of the heating elements, electronic components with large heat capacities including the thermistor 51, the group of input/output filters 52 for a charger, the charger power factor improving inductor 53, the charger power factor improving capacitor 54, and the DC output smoothing capacitor 55 are mounted on the heating element board 50b, and out of the heating elements, electronic components with small heat capacities are mounted on the aluminum board 50c.

Thus, providing a heating element board 50b on which only heating elements having large calorific values are disposed in a concentrated manner allows a reduction in a heat load of heat generation of the heating elements mounted on the heating element board 50b to be applied to other elements. Moreover, separating the position to arrange heating elements from the position to arrange other control elements allows an increase in the degree of freedom of layout of the pivot flanges 39 and the through-holes 19a, etc.

That is, in the board (control unit) 50, aggregating components that generate little heat on the control board 50a and disposing components with large heat capacities in a modularized manner on the heating element board 50b that is at a rear end side of the swing arm 30 with respect to the control board 50a allows having optimal placement by function, and space saving can be achieved.

The battery cells that compose the battery 56 are arranged to be respectively fixed to the aluminum board 50c so that the control unit 50 is disposed at a front end side of the swing arm.

As a result of the circuits of the control unit 50 being electrically connected with the respective battery cells, the battery 56 is charged, and a voltage from the battery 56 is supplied to the control board 50a to control driving of the electric motor M.

Moreover, by disposing the heating element board 50b on the side rearward of the vehicle body with respect to the control board 50a, effect of the thermal influence of the heating elements on the control board 50a located on the upstream side in the vehicle-body traveling direction can be prevented. Further, as a result of the control board 50a being disposed on the outside of the battery 56 in the vehicle width direction, the thickness in the vehicle width direction can be reduced. Also, because the heating board 50b is arranged at a position to overlap with the rear wheel WR in a side view of the vehicle body, the heating elements can be arranged, taking advantage of a space formed between the battery 56 and the electric motor M, so that an excessively long swing arm length can be prevented.

Moreover, as shown in FIG. 4, the battery 56, as a result of a predetermined number of cell plates being laminated in the front-rear direction of the vehicle body, shows a substantially rectangular parallelepiped shape where its longitudinal direction is oriented in the vehicle width direction, and is stored in the storage space 35 of the wide case portion 38. On an inner surface 43 of the storage space 35, guide grooves 44 to store the respective plate-like battery cells at predetermined positions, respectively, are formed.

The guide grooves 44 are arranged, by forming a plurality of groove portions corresponding to the respective battery cells along the direction into which the battery 56 is inserted at an upper surface and lower surface in the storage space 35, so that, when storing the respective battery cells that compose the battery 56, side surface portions of the cells (each cell) are fitted into the guide grooves 44 and can be fixed in position. Providing the guide grooves 44 allows eliminating a dedicated component for holding the cells and having a compact configuration as a whole.

In the wide case portion 38, a through-hole 38a into which a sealing plug 45 is fitted is formed. On the other hand, in a coupling plate 46 that couples the battery 56 and the board (control unit) 50 in a position forward of the vehicle body, a through-hole 47 into which the sealing plug 45 is fitted is formed. The sealing plug 45 and the through-holes 38a, 47 are used in a "resin potting process" that is performed during assembly of the swing arm 30. The potting process is for physically fixing the battery 56 and the board (control unit) 50 to the swing arm 30 as well as obtaining insulation and vibration isolation of the board (control unit) 50, and further increasing heat dissipation of the respective portions.

Figure 7:
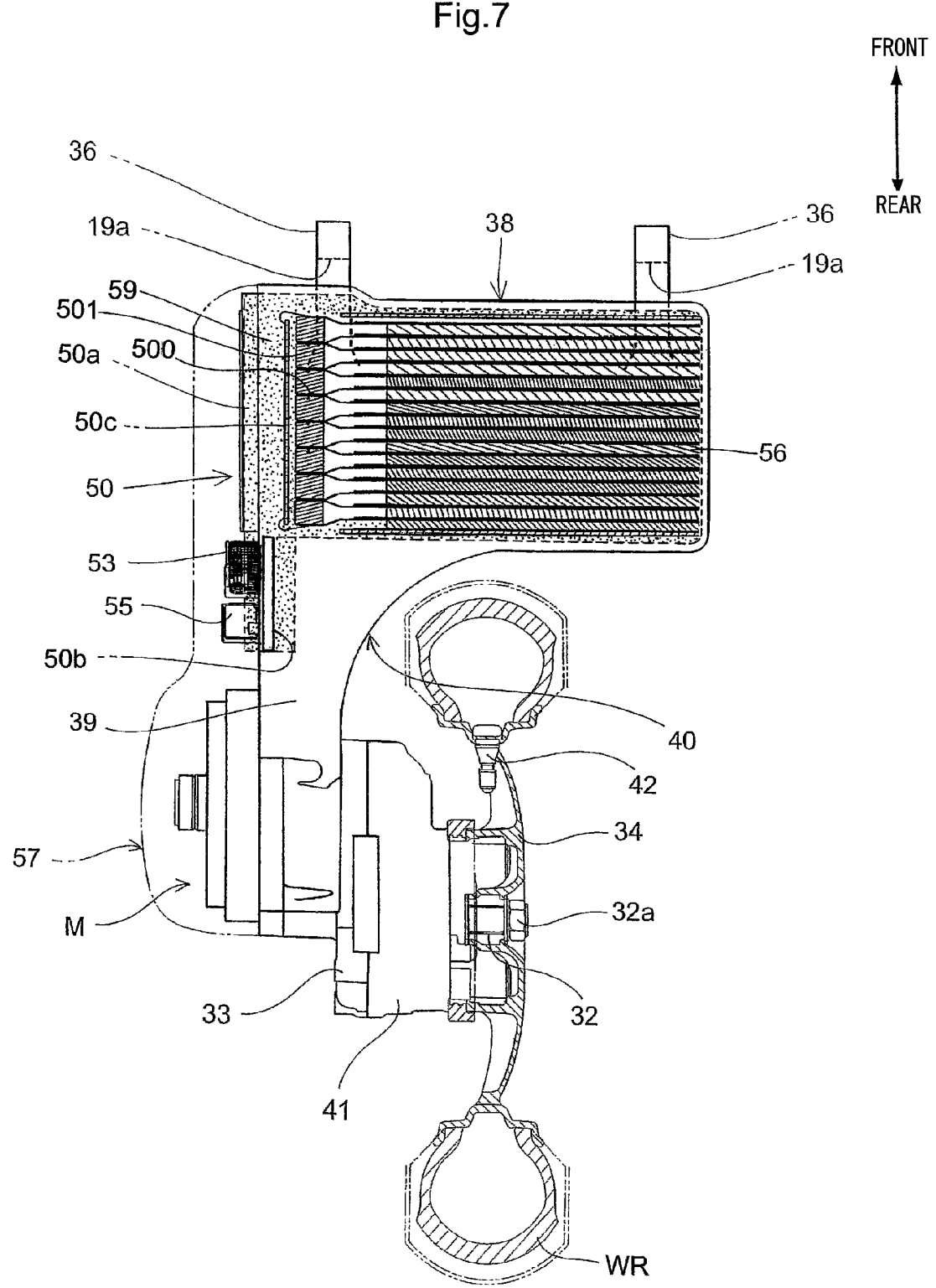
FIG. 7 is a top view of the swing arm after potting process.

The potting process is performed by inserting the battery 56 and the board (control unit) 50 into the wide case portion 38, performing positioning by fitting the sealing plug 47 into the through-holes 38a, 47, and then pouring the potting material 59 made of a liquid resin that hardens over time around the battery 56, with an opening portion of the wide case 38 facing upward. The potting material 59 is injected, as shown in FIG. 7, so as to cover the control board 50a and the aluminum board 50c and cover a part on the side of a mounting surface of the capacitor 53, the group of various transformers 55, etc., mounted on the heating element board 50b. The potting material 59 also has a function of increasing heat dissipation of the battery 56 etc.

Then, by removing the sealing plug 45 after the potting material 59 hardens, a communication hole that communicates the inside with the outside of the wide case portion 38 is formed at the position where the sealing plug 45 existed. By the communication hole, even when a gas is discharged from the battery 56, the gas is smoothly discharged to the outside, so that a rise in the pressure in the swing arm 30 can be prevented.

That is, a high-pressure releasing escape passage that externally leads an air pressure (for high pressure release) when the ambient temperature of the battery having reached a high temperature has risen can be formed by a potting material, so that a dedicated member for forming an escape passage can be eliminated.

The potting material poured into the storage space 35 from the periphery is filled around a space of the battery 56 stored in the storage space 35 to harden in a state where the potting material exists around a space including at least a coupling part with the control board 50a in an upper portion of the cells, so that the position of the battery 56 is fixed with respect to the storage space 35 due to interposition of the potting material. The swing arm cover 57 to serve as a lid body is covered in this state on the opening side of the storage space 35.

According to this structure, by fixing the battery 56 positioned in the storage space 35 by interposition of the potting material, the battery 56 can be mounted in the swing arm 30 in an integrated manner. Moreover, by fixing the control board 50a together with the battery (battery cells) 56 by potting, a dedicated fixing component can be eliminated.

Figure 8:
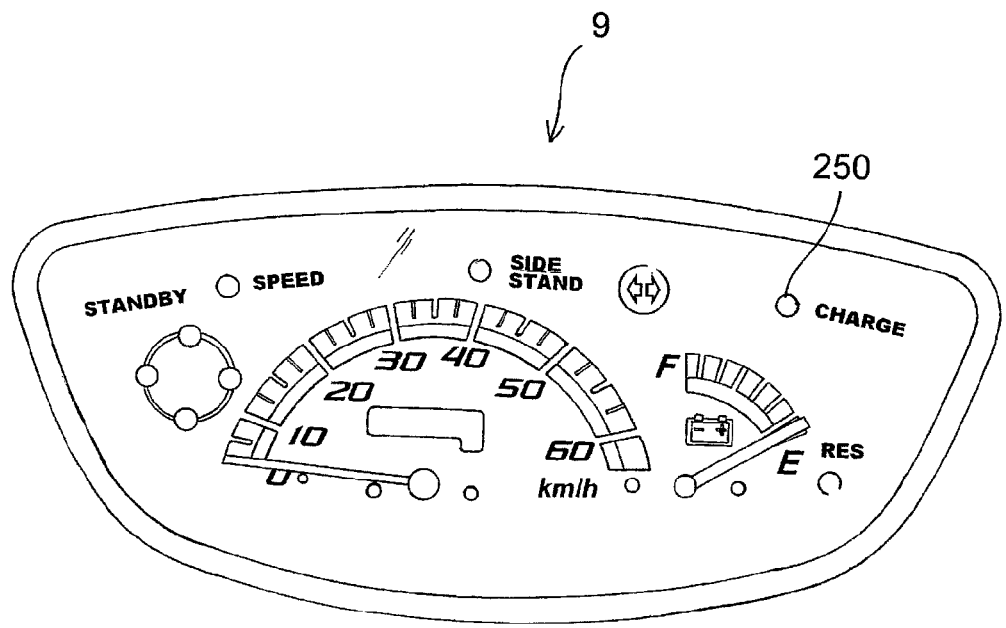
FIG. 8 is an explanatory plan view showing an example of a meter device mounted on a vehicle.

In the meter device 9, as shown in FIG. 8, an indicator 250 for confirming charge of the charger 200 is provided. This indicator 250 is arranged so as to turn on when the AC plug (charging terminal) 215 of the charge cord 220 is taken out of the storage portion and inserted in an external outlet to start charging and turn off when the charging is completed. Accordingly, because the AC plug (charging terminal) 215 can be pulled out of the outlet after the indicator 250 turns off, charge confirmation can be easily performed.

According to the foregoing arrangement, by making a dedicated case for holding the battery 56 no longer necessary and using the swing arm 30 itself as a case to hold the battery 56, a reduction in the number of components and a reduction in weight can be performed despite reliably fixing the battery 56 to the swing arm 30.

Because a structure in which the battery 56 being a heavy object can be incorporated later is provided, vehicle assemblability is improved, and it is also not necessary to make the swing arm 30 partially bulge in line with the shape of the battery 56, which thus contributes to a reduction in the number of components and a reduction in weight, while the battery 56 can be reliably fixed to the swing arm 30.

Directly fixing the battery 56 to the swing arm 30 allows using the swing arm 30 as a heat sink, so that the effect of cooling the battery 56 can be improved.

Moreover, as a result of simplifying the mounting structure of the battery 56, the battery unit as a whole can be made compact, and the degree of freedom in design with respect to other configurations, such as placement of electrical components, can be improved.

Figure 9:
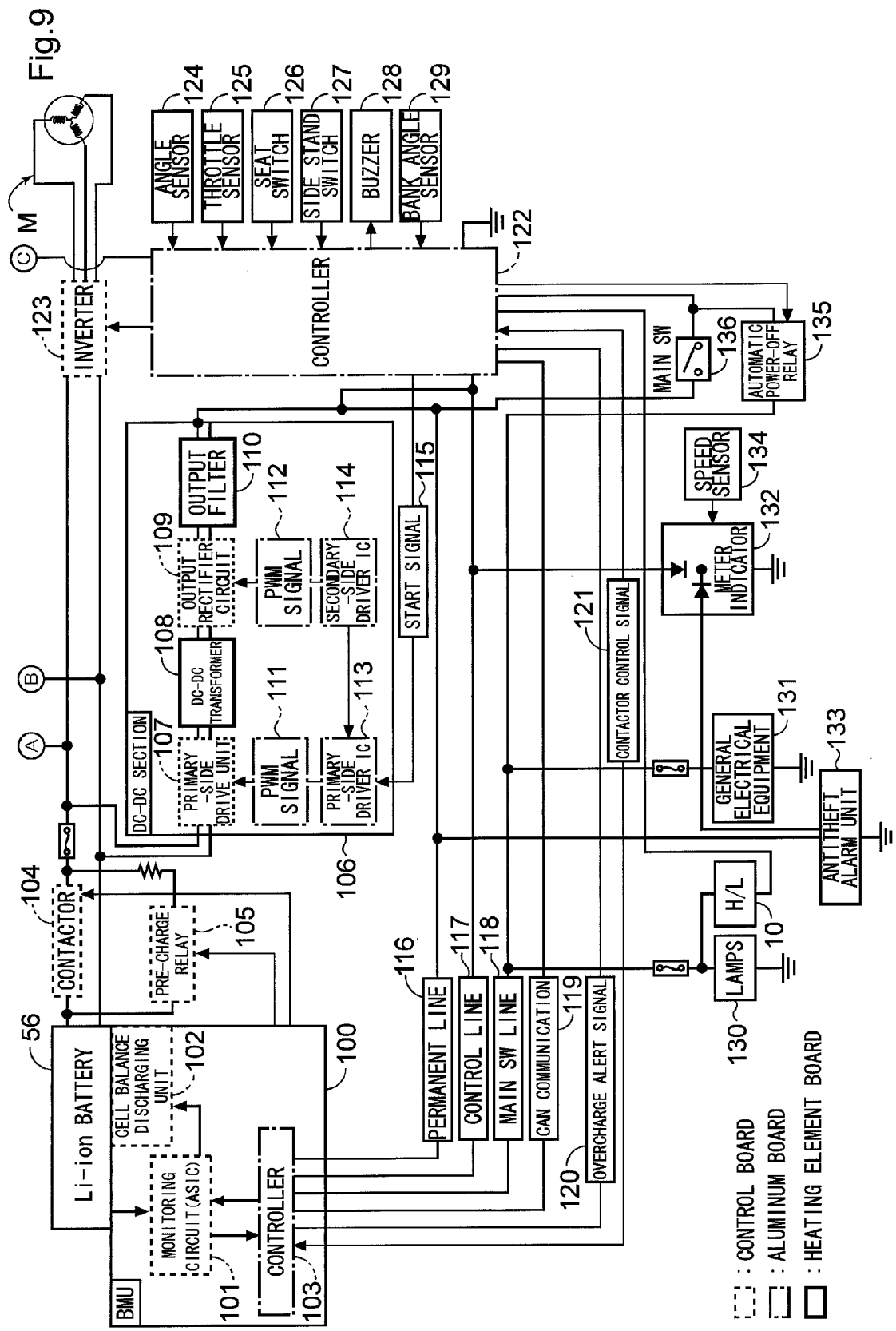
FIG. 9 is a block diagram showing a whole configuration of an electrical system to be applied to the electric two-wheeled vehicle.
Figure 10:
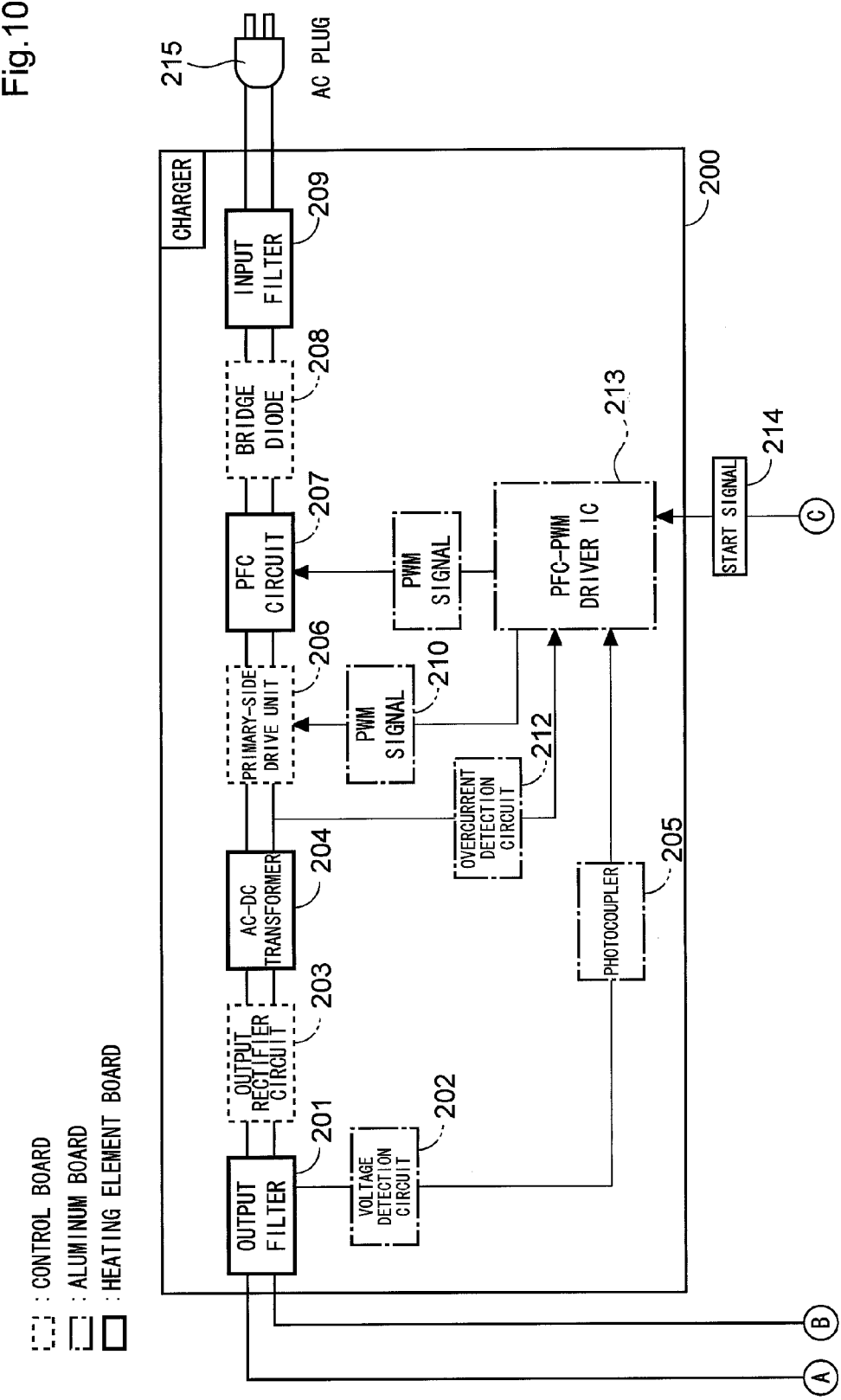
FIG. 10 is a block diagram showing a configuration of a component circuitry of only a charger of an electrical system to be applied to the electric two-wheeled vehicle.

FIG. 9 and FIG. 10 are block diagrams showing a configuration of an electrical system to be applied to the electric two-wheeled vehicle 1. The same reference signs as the above denote the same or equivalent parts. FIG. 10 shows a component circuit of only a charger, and FIG. 9 shows an overall configuration other than the same. In FIGS. 9 and 10, elements mounted on the control board 50a are shown by "broken lines," elements mounted on the aluminum board 50c are shown by "alternate long and short dashed lines," and elements mounted on the heating element board 50b are shown by thick "solid lines."

On the control board 50a, elements for control signals in which a small current flows are mounted. These elements generate little heat, and the control board 50a is formed by a glass epoxy board. Moreover, on the aluminum board 50c, elements in which a large current flows and which are incapable of self-heat dissipation are mainly mounted. Examples of these electronic components include a semiconductor element (FET, diode), a resistor, and a film capacitor, and these are increased in heat dissipation by being mounted on the highly heat-conductive aluminum board 50c. Further, on the heating element board 50b, large-sized electronic components in which a large current flows and which are capable of self-heat dissipation are mainly mounted. Examples of these electronic components include an inductor, a transformer, and an electrolytic capacitor, and the heating element board 50b is arranged at a position where the influence of battery heat is unlikely to be received to obtain an improvement in heat dissipation.

Also, in the block diagrams of FIGS. 9 and 10, elements mounted on the heating element board 50b are an input filter 209 and an output filter 201 (corresponding to the above-described group of input/output filters 52), a PFC circuit 207 (corresponding to the above-described charger power factor improving capacitor 53), and an AC-DC transformer 204 (corresponding to the above-described charger DC-converting capacitor 54) of the charger 200 and a DC-DC transformer 108 (corresponding to the above-described group of various transformers 55) and an output filter 110 of a DC-DC section 106.

Referring to FIG. 9, the lithium ion battery 56 is electrically connected to an input side of an inverter 123 via a contactor 104, and an output side of the inverter 123 is connected to the electric motor M by a three-phase alternating current line. To the contactor 104 that is on/off controlled by a mechanical contact that operates with an electromagnetic force, a pre-charge relay 105 that prevents a surge in supply current is connected in parallel.

A BMU (Battery Management Unit) 100 includes a monitoring circuit (ASIC) 101 for the voltage, temperature, etc., of the battery 56, a cell balance discharging unit 102 for correcting a variation in the capacity of battery cells, and a controller 103 that controls these.

Between the controller 103 in the BMU 100 and a controller 122 serving as a control device for controlling the inverter 123, respective lines for a permanent system 116, a control system 117, a main switch system 118, and CAN communication 119 are arranged. Moreover, an overcharge alert signal 120 is transmitted from the controller 103 of the BMU 100, and a contactor control signal 121 is transmitted from the controller 122 of the inverter 123.

To the controller 122 of the inverter 123, sensor signals are input from an angle sensor 124 that detects the rotation angle of the electric motor M, a throttle sensor 125 that detects the throttle operation amount by a rider, a seat SW (switch) 126 that detects whether the rider is seated on the seat 20, a side stand SW 127 that detects whether a side stand (not shown) of the electric vehicle 1 is retracted, and a bank angle sensor 129 that detects the inclination (bank angle) of the electric vehicle. A buzzer 128 serving as an alarm is actuated in response to an actuation signal from the controller 122 when an overdischarged state or the like of the battery 56 is detected.

The permanent line 116 is connected to the DC-DC section 106 that converts a large current supplied from the battery 56 to a control current. The DC-DC section 106 includes a primary-side drive unit 107, a DC-DC transformer 108, an output rectifier circuit 109, an output filter 110, a primary-side driver IC 113 that supplies a PWM signal to the primary-side drive unit 107, and a secondary-side driver IC 114 that supplies a PWM signal to the output rectifier circuit 109. To the primary-side driver IC 113, a start signal 115 is supplied from the controller 122. Moreover, to the permanent line 116, one-end sides of an antitheft alarm unit 133 and a main SW 136 are connected.

The control line 117 is connected to the controller 122 of the inverter 123. To the control line 117, one end of a meter indicator 132 serving as an actuation indicator lamp of the antitheft alarm unit 133 is connected. Moreover, the meter indicator 132 is connected with a speed sensor that detects a vehicle speed, and the meter indicator 132 is arranged so as to function as a speed warning lamp when the vehicle speed exceeds a predetermined value.

To the main SW line 118, lamps 130 such as blinkers, a headlight (H/L) 10, and general electrical equipment 131 such as a battery cooling fan. An end portion of the main SW line 118 is connected to an automatic power-off relay 135 that enables actuation of the headlight 10 etc., under a predetermined condition even if the main SW 136 is turned off.

Referring to FIG. 10, to the charger 200, input and output lines (A, B) of a direct current to be connected to the battery 56 and an AC plug 215 to be connected to a commercial alternating current power supply, or the like are connected. The charger 200 includes an input filter 209, a bridge diode 208, a PFC circuit 207 serving as a power factor improving circuit, a primary-side drive unit 206, an AC-DC transformer 204, an output rectifier circuit 203, and an output filter 201. A signal of an overcurrent detection circuit 212 disposed between the primary-side drive unit 206 and the AC-DC transformer 204 is input to a PFC-PWM driver IC 213. On the other hand, a signal of a voltage detection circuit 202 connected to the output filter 201 is input to a PFC-PWM driver IC 213 via a photocoupler 205. The PFC circuit 207 and the primary-side drive unit 206 are driven by PWM signal 210 output from the PFC-PWM driver IC 213, respectively. To the PFC-PWM driver IC 213, a start signal 214(c) from the controller 122 of the inverter 123 is input.

REFERENCE SIGNS LIST

1: electric two-wheeled vehicle,
2: vehicle body frame,
8: steering handle,
9: meter device,
16: low floorboard,
19: swing shaft,
30: swing arm,
32: axle,
35: storage space,
38: wide case portion,
38a: through-hole,
39: arm portion,
40: curved portion,
44: guide grooves,
45: sealing plug,
50: board (control unit),
50a: control board,
50b: heating element board,
50c: aluminum board,
56: battery,
57: swing arm cover,
59: potting material,
215: AC plug (charging terminal),
200: charger,
220: charge cord,
230: cap,
250: indicator,
300, 301, 302, 303, 304, 305: storage portion,
306: lid,
400: floor tunnel,
401: steps,
M: electric motor,
WR: rear wheel

The invention claimed is:

1. A swing arm device for an electric two- or three-wheeled vehicle to be fitted on an electric vehicle including a swing arm one end of which is coupled to a swing shaft and the other end of which supports a rear wheel, an electric motor placed at the other end side of the swing arm and for driving the rear wheel, and a power drive unit, PDU, and a battery for supplying electric power to the electric motor, wherein
a charger for charging the battery is incorporated in the swing arm.

2. The swing arm device for an electric two- or three-wheeled vehicle according to claim 1, wherein a control unit for controlling energization of the electric motor is disposed at a front end side of the swing arm, the charger is integrally disposed on the control unit, while the charger includes a charge cord for external charging, a storage portion for storing the charge cord is provided on a vehicle body side of the electric vehicle, and the charge cord is routed into the storage portion from the control unit through near the swing shaft of the swing arm.

3. The swing arm device for an electric two- or three-wheeled vehicle according to claim 2, wherein components with small heat capacities are aggregated on a control board that is placed at a vehicle front side in the control unit and components with large heat capacities are disposed in a modularized manner at a rear end side of the swing arm with respect to the control board.

4. The swing arm device for an electric two- or three-wheeled vehicle according to claim 2, wherein a storage portion for storing the charge cord is provided under a floorboard of the electric vehicle.

5. The swing arm device for an electric two- or three-wheeled vehicle according to claim 2, wherein a storage portion for storing the charge cord is provided under a step of the electric vehicle.

6. The swing arm device for an electric two- or three-wheeled vehicle according to claim 2, wherein a storage portion for storing the charge cord is provided below a storage box of the electric vehicle.

7. The swing arm device for an electric two- or three-wheeled vehicle according to claim 6, wherein a lid for taking out the charge cord is provided in an exterior surface that covers the outside below the storage box.

8. The swing arm device for an electric two- or three-wheeled vehicle according to claim 2, including a cap for insulation and waterproofing in a charging terminal at a tip of the charge cord.

9. The swing arm device for an electric two- or three-wheeled vehicle according to claim 2, wherein the charge cord has stretchability.

10. The swing arm device for an electric two- or three-wheeled vehicle according to claim 1, wherein in a meter device for indicating a vehicle state placed on the electric vehicle, an indicator for confirming charge of the charger is provided.

* * * * *